United States Patent [19]
Yonekawa

[11] Patent Number: 5,289,807
[45] Date of Patent: Mar. 1, 1994

[54] BYPASS AIR-FLOW CONTROL APPARATUS FOR AN INTERNAL COMBUSTION ENGINE

[75] Inventor: Masao Yonekawa, Kariya, Japan
[73] Assignee: Nippondenso Co., Ltd., Kariya, Japan
[21] Appl. No.: 55,324
[22] Filed: May 3, 1993

[30] Foreign Application Priority Data
May 6, 1992 [JP] Japan .................................. 4-113678

[51] Int. Cl.$^5$ ............................................. F02D 41/16
[52] U.S. Cl. ..................................... 123/325; 123/327; 123/339
[58] Field of Search .................. 123/325, 327, 339, 585

[56] References Cited

U.S. PATENT DOCUMENTS

| | | | |
|---|---|---|---|
| 4,385,603 | 5/1983 | Bonse et al. | 123/339 |
| 4,572,141 | 2/1986 | Hasegawa et al. | 123/339 |
| 4,616,614 | 10/1986 | Abe | 123/339 |
| 4,617,890 | 10/1986 | Kobayashi et al. | 123/339 |
| 4,700,679 | 10/1987 | Otobe et al. | 123/327 |
| 4,721,082 | 1/1988 | Hibino et al. | 123/339 |
| 4,771,750 | 9/1988 | Breitkreutz et al. | 123/339 |
| 4,856,475 | 8/1989 | Shimomura et al. | 123/339 |
| 4,884,540 | 12/1989 | Kishimoto et al. | 123/339 |
| 5,048,483 | 9/1991 | Nakazawa | 123/339 |

FOREIGN PATENT DOCUMENTS

1-237338 9/1989 Japan .
2-308942 12/1990 Japan .

Primary Examiner—Willis R. Wolfe
Attorney, Agent, or Firm—Cushman, Darby & Cushman

[57] ABSTRACT

A bypass air flow rate control apparatus has an idle speed control valve for continuously adjusting an air flow rate and an on-off control valve for allowing and shutting off an air flow passing therethrough. When an atmospheric pressure sensor detects that the atmospheric pressure is lower than a predetermined value, in other words, the density of intake air is lower than a predetermined value, the on-off control valve and the idle speed control valve are switched over. The air flows through the on-off control valve by an amount corresponding to the air flow rate reduced in the idle speed control valve. The valve switching over operation is performed when one of the following three conditions is satisfied: the engine is generating no torque, in other words, the engine is in a fuel cut operation; a load larger than a predetermined load value is applied; and the engine is accelerated at a rate equal to or greater than a predetermined value. In the latter two conditions, a large torque is generated by the engine. As a result, a torque variation due to the air flow rate variation upon the valve switch over is restrained, so that the vehicle shock which gives a driver a feeling of uneasiness can be relieved and the drivability can be improved.

17 Claims, 5 Drawing Sheets

BYPASS AIR-FLOW CONTROL APPARATUS FOR AN INTERNAL COMBUSTION ENGINE

BACKGROUND OF THE INVENTION

1. Field of the Invention

The present invention relates to a bypass air flow rate control apparatus for an internal combustion engine and, more particularly, to an apparatus for controlling to change the operation of a plurality of control valves provided in bypass passages.

2. Description of the Related Art

Japanese Patent Unexamined Publication No. 2-308942 discloses an idle speed control apparatus which maintains engine speed at a desired level despite aging deterioration of an idle speed control valve for controlling air flow rate or a reduction in air density (or air pressure) occurring, for example, at a high altitude. This apparatus comprises first and second bypass passages bypassing a throttle valve. The first bypass passage is provided with an idle speed control valve, and the second bypass passage is provided with an electromagnetic on-off control valve. The opening degree of the idle speed control valve is continuously adjusted in accordance with duty values.

In order to prevent for a required amount of intake air from being not obtained due to aging deterioration of the idle speed control valve or a reduction in air density caused at a high altitude, the above-described apparatus has preset upper and lower critical values for duty values. When a duty value exceeds the upper critical value, the on-off control valve is applied an electric current and thus opened, and, simultaneously, the duty value for the idle speed control valve is reduced by an amount corresponding to the air flow rate passing through the on-off control valve. Whereby, the opening degree of the idle speed control valve is reduced by an amount corresponding to the air flow rate passing through the second bypass passage, so that it is possible to increase control region of the idle speed control valve when air flow rate is required.

When the a duty value becomes lower than the lower critical value and the on-off control valve has been opened, the duty value for the idle speed control valve is increased and, simultaneously, the on-off control valve is closed.

As described above, an amount of intake air corresponding to duty value is always obtained by the switch over control of the idle speed control valve and the on-off control valve.

However, there is a case in which the characteristics of the air flow rate passing through the idle speed control valve and the on-off control valve are varied due to aging deterioration, product variation and the like. Therefore, when the on-off control valve is opened by an electric current being applied and the opening degree of the idle speed control valve is reduced by an amount corresponding to the increased air flow rate of the on-off control valve, there is a case in which the bypass air flow rate varies instantaneously for example, as shown in FIGS. 5 and 6.

Figure 5:
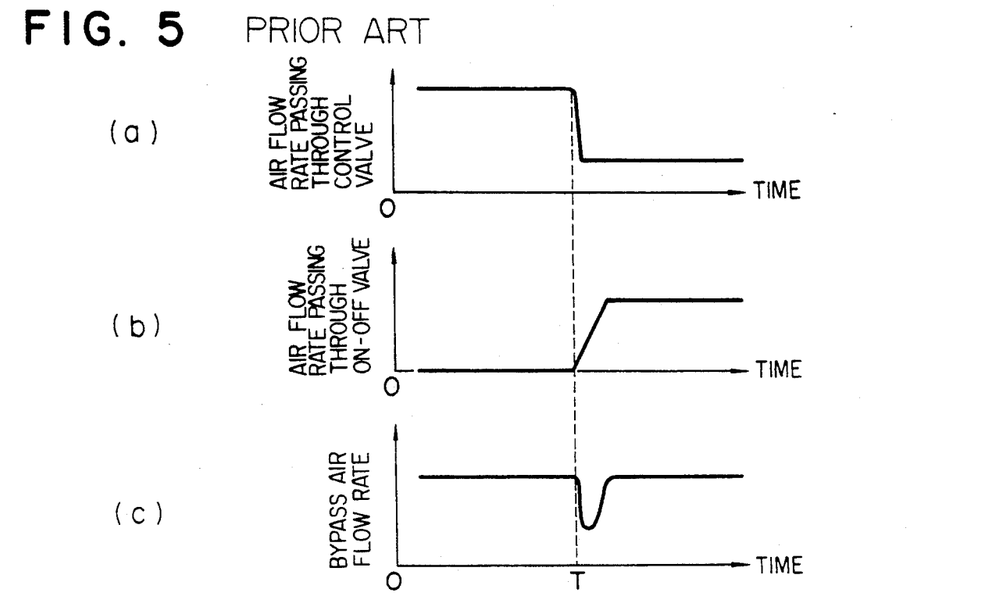
Figure 6:
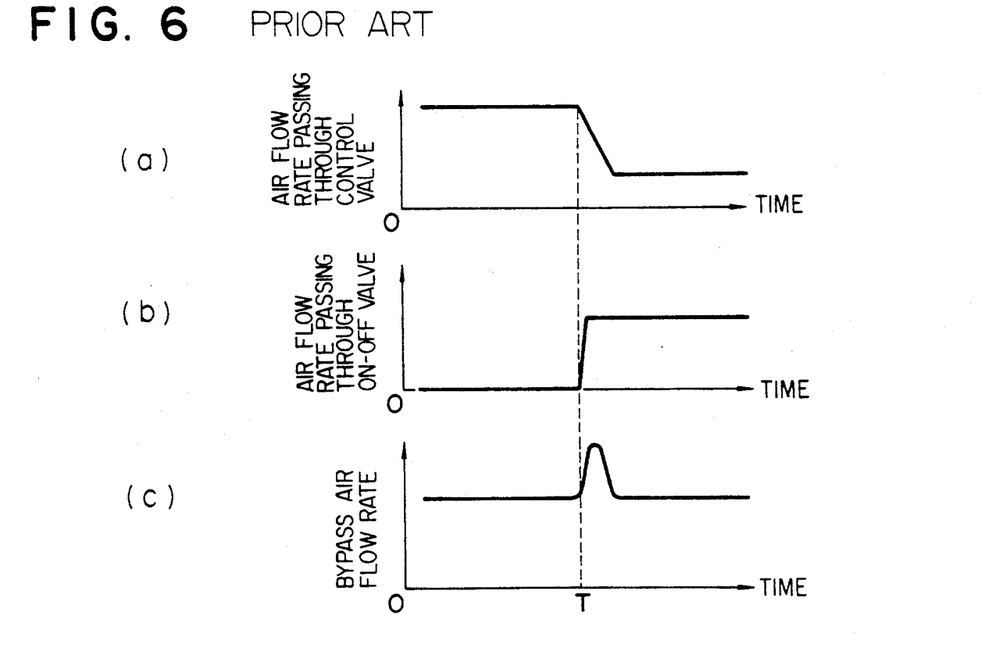

FIGS. 5(a) and 6(a) show the relationships between air flow rate passing through the idle speed control valve and time, FIGS. 5(b) and 6(b) show the relationships between air flow rate passing through the on-off control valve and time, and FIGS. 5(c) and 6(c) show the relationship between bypass air flow rate and time.

As shown in FIGS. 5 and 6, when the idle speed control valve and the on-off control valve are switched over at time T, the bypass air flow rate is temporarily increased or reduced if the valve opening rate and the valve closing rate of the valves are different from each other even if air flow rates changed by the opening and closing of each of the valves are identical with each other.

Further, in the apparatus of the publication, the switch over from the idle speed control valve to the on-off control valve is effected when a duty value for the idle speed control valve is beyond the upper or lower critical value. Therefore, during idling, the change in the bypass air flow rate causes a relatively large torque change, thus causing a shock to the vehicle and the driver to have uneasy feelings.

SUMMARY OF THE INVENTION

In view of the above described problems, an object of the present invention is to provide a bypass air flow rate control apparatus which performs the valve switch over under predetermined conditions to relieve shocks to the vehicle to improve the drivability of the vehicle.

A bypass air flow rate control apparatus for an internal combustion engine according to the present invention comprises: a plurality of bypass passages bypassing a throttle valve of the internal combustion engine; a plurality of control valves for respectively controlling the air flow rates passing through the bypass passages; switch over judging means for judging whether it is the time when the number of the control valves operated should be switched over; engine operation judging means for judging at least one of whether the internal combustion engine is in a state where a torque equal to or greater than a predetermined torque value is being generated and whether the internal combustion engine is in a state where no torque is being generated; and switch over means for changing over the number of the control valves operated when the switch over judging means has judged that the number of the control valves should be switched over and the engine operation judging means has judged that the internal combustion engine is in the state where a torque equal to or greater than a predetermined torque value is being generated or the state where no torque is being generated.

The switch over judging means may comprise means for judging whether the pressure of an atmosphere is lower than a predetermined value.

During a vehicle is running, the number of the control valves operated is switched over when the switch over judging means has judged that the number of the control valves operated should be switched over and the engine operation judging means has judged that the internal combustion engine is in the state where a torque equal to or greater than a predetermined valve is generated or in the state where no torque is generated.

By the number of the control valves operated is switched over under the predetermined judging conditions as described above, shocks to the vehicle caused upon valve switch over are relieved and the drivability of the vehicle is significantly improved.

If the atmospheric pressure judging means is used as the switch over judging means, it is judged whether the pressure of atmosphere is lower than a predetermined value. The number of the control valves operated is determined on the basis of the atmospheric pressure judging means and the engine operation judging means.

BRIEF DESCRIPTION OF THE DRAWINGS

FIGS. 5a-c are timing charts of an idle speed control valve, an on-off control valve and bypass air flow rate.

FIGS. 6a-c are timing charts of an idle speed control valve, an on-off control valve and bypass air flow rate.

DESCRIPTION OF THE PREFERRED EMBODIMENT

A preferred embodiment of the present invention will be described hereinafter with reference to the attached drawings.

Figure 1:
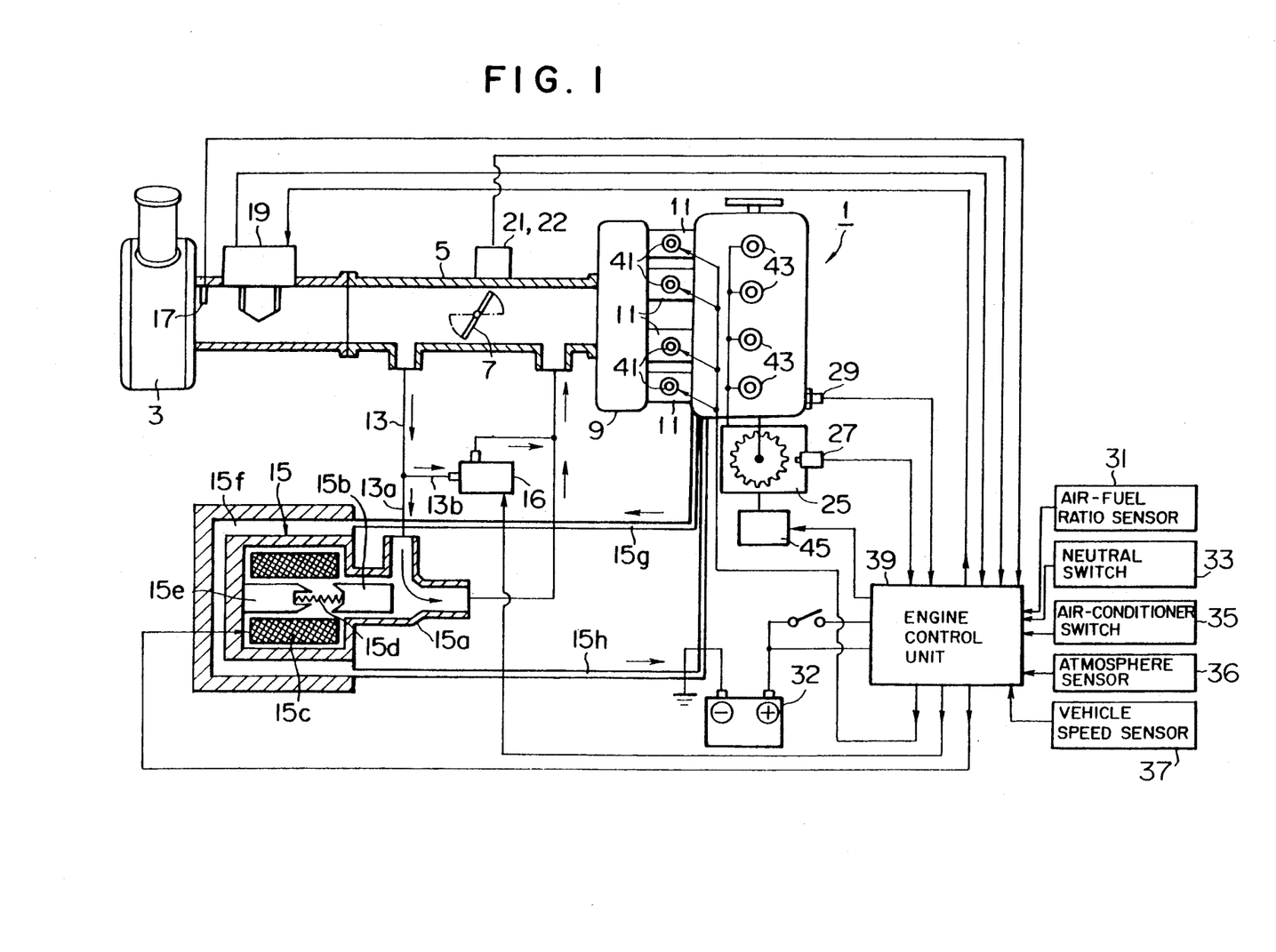
FIG. 1 is a partial sectional view of a bypass air flow rate control apparatus for an internal combustion engine according to the present invention.

FIG. 1 illustrates a portion of an embodiment of a bypass air flow rate control apparatus according to the present invention, more specifically, a control system for electronically controlling a fuel injection amount and the like in accordance with operational conditions of a four-cylinder gasoline internal combustion engine 1. Air taken in through an air filter 3 flows through an intake pipe 5, passing through a throttle valve 7 operated by means of an accelerator pedal (not shown). The intake air further flows through a surge tank 9 and an intake manifold 11 to each of the four cylinders of the internal combustion engine 1. A portion of the air drawn through the air filter 3 flows through a bypass passage 13 extending around the throttle valve 7 to the surge tank 9. The bypass passage 13 branches into a first sub-bypass passage 13a and a second sub-bypass passage 13b which join into one passage connecting to the surge tank 9.

The first sub-bypass 13a is provided with a liner solenoid type idle speed control valve 15. The second sub-bypass 13b is provided with an electromagnetic on-off control valve 16. The two control valves 15 and 16 adjust an amount of air flowing through the bypass passage 13 (bypass air flow rate) by adjusting openings of the respective sub-bypass passages 13a and 13b.

Figure 2:
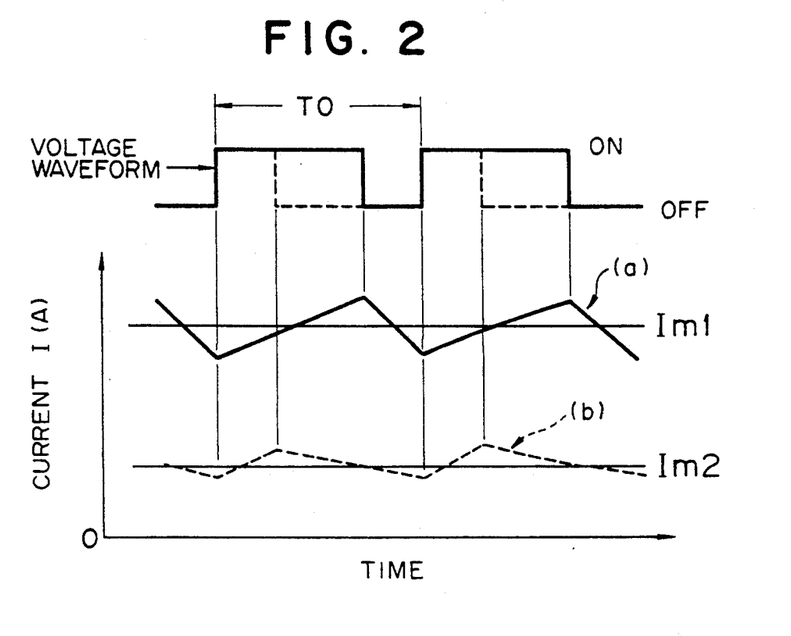
FIG. 2 is a graph showing the relationship between duty signals and electric current.

The idle speed control valve 15 changes the cross-sectional area of the air passage at the valve 15 by the following mechanism. A valve member 15a provided so as to be linearly slidable in a housing 15a of the idle speed control valve 15 is moved (displaced) toward a core 15e despite the restoring force of a spring 15d by a force induced when electric current is supplied to a coil 15c in response to a duty signal. The duty signal is a voltage signal having a rectangular waveform as shown in FIG. 2. A duty ratio of such duty signal represents a rate of the time during which an electric current is applied per one cycle TO. When the dury ratio is increased, an average electric current Im1 becomes large as indicated by (a) in FIG. 2. Accordingly, the displacement of the valve member 15b becomes larger and the sectional area of the air passage of the idle speed control valve 15 in increased. Contary thereto, when the dury ratio is reduced, then the averate current Im2 becomes small as indicated by (b) in FIG. 2. Accordingly, the displacement of the valve member 15b becomes smaller and the sectional area of the air passage of the idle speed control valve 15 is reduced.

The idle speed control valve 15 further comprises a passage 15f surrounding the housing 15a. The passage 15f is connected to coolant passages 15g and 15h connected to the internal combustion engine 1. Thereby, a coolant flows from the internal combustion engine 1 via the idle speed control valve 15 and back to the engine 1.

In the on-off control valve 16, while an electric current is applied, the passage is opened and a predetermined amount of air flows, and when an electric current is shut off, the passage inclosed and air does not flow.

The intake pipe is provided with an intake-air temperature sensor 17 for detecting the temperature of intake air, an air flow meter 19 for detecting the flow rate of the intake air, a throttle switch 21 for detecting that the throttle valve 7 is completely closed or fully opened and a throttle sensor 22 for measuring the opening degree of the throttle valve 7.

The internal combustion engine 1 is provided with a coolant temperature sensor 29 for detecting the temperature of the coolant flowing around the internal combustion engine 1, a rotation sensor 27 which is provided in a distributor 25 and which detects the operational speed of the internal combustion engine and accordingly outputs a pulse signal and a battery 32 for supplying power to an engine control unit 39 described in detail below. Further provided are an air-fuel ratio sensor 31 provided in an exhaust pipe (not shown), a neutral switch 33 for outputting a neutral signal when a transmission (not shown) is in the neutral range, an air-conditioner switch 35 for detecting whether an air conditioner (not shown) is on or off, an atmospheric pressure sensor 36 for detecting the pressure of the atmosphere and a vehicle travelling speed sensor 37 for detecting the travelling speed of the vehicle.

The detection signals outputted by these sensors are inputted to the internal combustion engine control unit 39, which has a logic operation circuit basically composed of a CPU, a ROM, a RAM and a back-up RAM (not shown).

The logic operation circuit is connected to an input portion and an output portion (not shown) of the engine control unit 39 by means of a common bus (not shown). Thus, the logic operation circuit receives signals from the above-described sensors and outputs driving signals and currents to various devices.

The driving signals include a duty signal to the coil 15c of the idle speed control valve 15, a switch-on signal to the on-off control valve 16, a heating current for heating the air flow meter 19, valve-opening signals to fuel injection valves 41 which are provided in the intake manifold 11 for every cylinder and which inject fuel into the intake air of the respective cylinders and ignition signals to an igniter 45 which supplies, via the distributor 25, a high-level voltage to the spark plugs provided in each cylinders.

The engine control unit 39 also has means for obtaining the pressure of the atmosphere by using the atmospheric pressure sensor 36 and judging whether the pressure of the atmosphere is lower than a predetermined value. This air density judging means also serves as means for judging whether or not to switch over the number of the control valves 15, 16 operated. The engine control unit 39 further comprises switch over means for switching over the number of the operated control valves and engine operation judging means for judging the operational conditions of the internal combustion engine 1.

Figure 3:
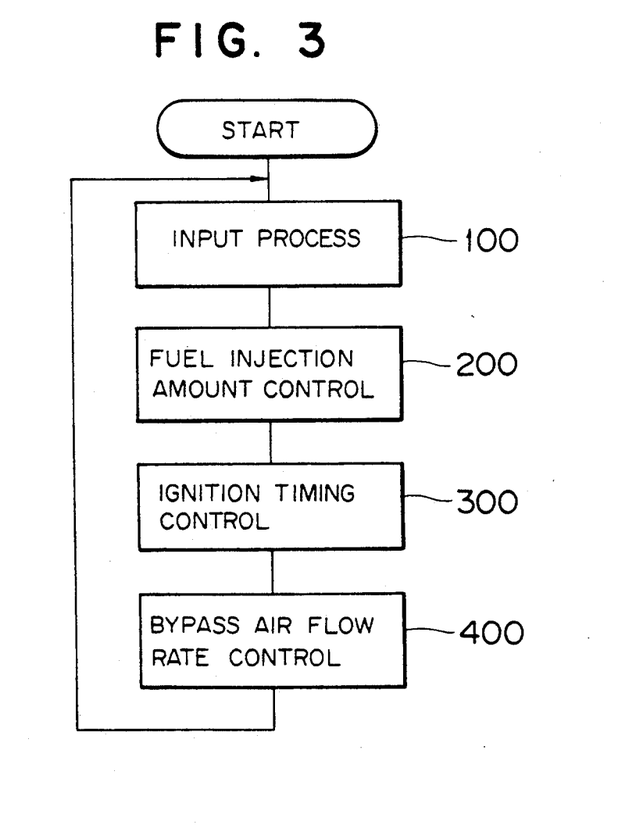
FIG. 3 is a flowchart of the operation of an internal combustion engine control unit.

The internal combustion engine control unit 39 will be described in detail hereinafter. As shown in FIG. 3, the engine control unit 39 performs ordinary engine control operations, that is, input processing (step 100), control of an amount of fuel to be injected (step 200), ignition timing control (step 300), and bypass air flow rate control (step 400).

In the input processing (step 100), detection signals from the various detecting means are read in. In an engine operation detection processing of the input processing, the size of the current engine load and the operational mode of the engine, that is, acceleration, constant speed operation or deceleration, are judged.

In the control of the amount of fuel to be injected (step 200), a basic amount of fuel to be injected is calculated on the basis of the current intake air flow rate and engine speed. Then, in a fuel injection control processing (not indicated), the basic amount of fuel to be injected is corrected into an actual amount of fuel to be injected, by feeding back an output of the air-fuel ratio sensor 31 thereto and other various corrections are effected in response to needs. In accordance with the actual amount of fuel to be injected, the period during which the fuel injection valves 41 is opened is controlled. Further, when the throttle switch 21 has determined that the throttle valve 7 is completely closed and the operation speed of the engine 1 obtained from the rotation sensor 27 is a predetermined value and greater, the engine control unit 39 determines that the fuel supply must be discontinued and accordingly stops fuel injection.

In the ignition timing control (step 300), basic ignition timing is calculated on the basis of the current engine speed, intake air flow rate and air-fuel ratio. Then, in an ignition timing control processing (not indicated), the basic ignition timing is corrected as required to obtain an actual ignition timing. In accordance with the actual ignition timing, the engine control unit 39 adjusts the output timing of a high-level voltage supplied from distributor 25 to the spark plugs 43.

The bypass air flow rate control (step 400) basically comprises the following three kinds of control operations: idle speed control, deceleration timing control, and valve switching control according to the present invention.

In the idle speed control, a target engine speed is calculated during an idling operation, on the basis of the current operational state of the engine, for example, the operations (on or off) of auxiliary devices, such as the air conditioner, the head lights and the power steering, and the coolant temperature. Then, in an idle speed control processing (not shown), the target engine speed is corrected as required. Accordingly, the engine control unit 39 adjusts the opening of the idle speed control valve 15 so as to allow such an air flow through the bypass passage 13 that the target idle engine speed will be achieved.

In the deceleration control, the opening degree of the idle speed control valve 15 is controlled in such a manner that air of which flow rate is greater than the air flow rate during the idle operation by a predetermined amount passes through the bypass passage 13, in order to avoid an undesired reduction of the engine speed at the deceleration from the running to the idle condition.

Since the above processings and control operations based on the results of the processings are well known, no further description thereof will be made.

The valve switch control, that is, a main feature of the present invention, will be described.

Figure 4:
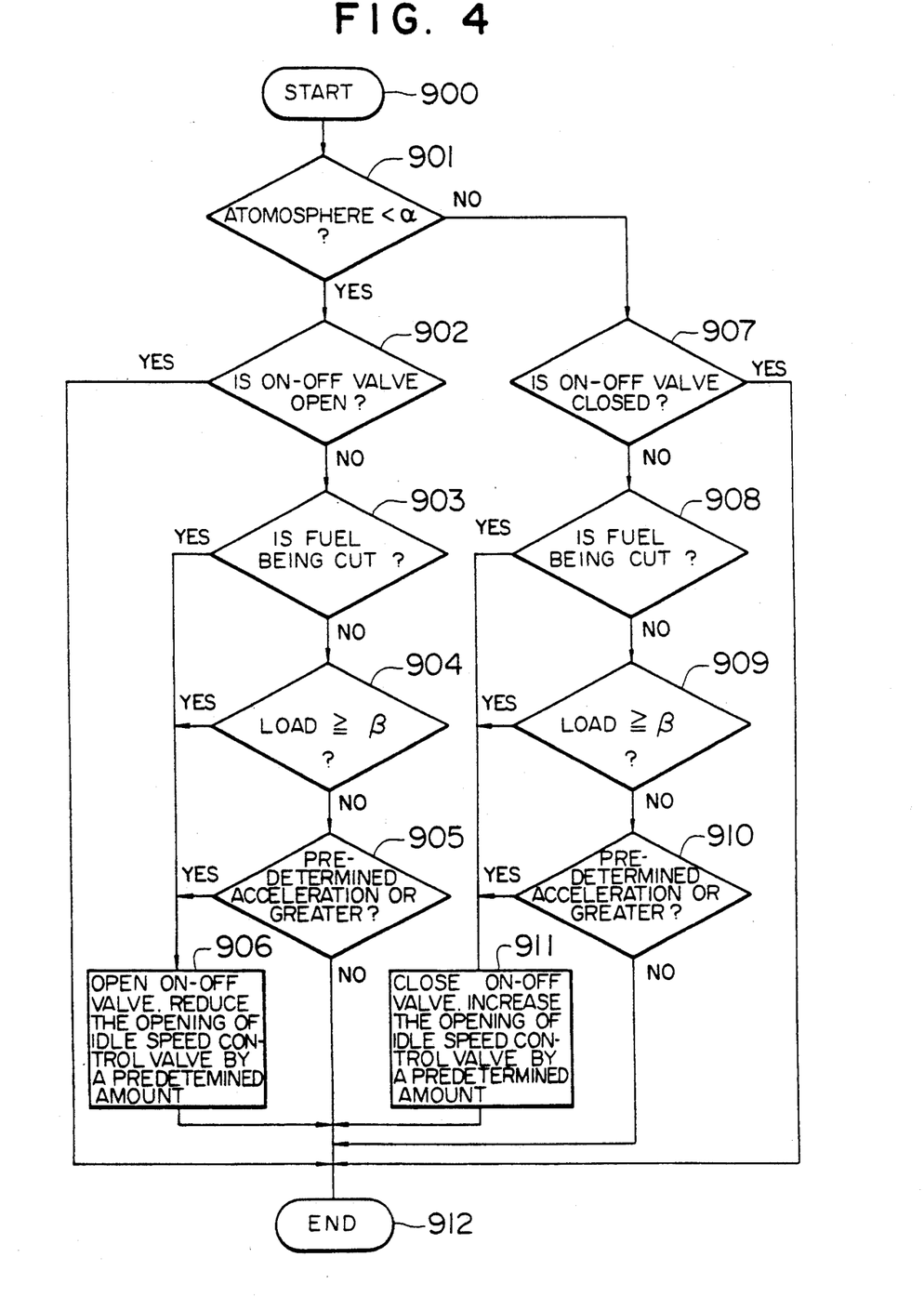
FIG. 4 is a flowchart of the operation of the bypass air flow rate control apparatus according to the invention.

As shown in FIG. 4, it is judged whether the pressure of the atmosphere detected by the atmospheric pressure sensor 36 is lower than a predetermined value $\alpha$ (step 901). Basically, according to the embodiment, the bypass air flow is controlled by using only the idle speed control valve 15 when the atmospheric pressure is high. When the atmospheric pressure is low and the air density is low, an electric current is applied to the on-off control valve 16, so that the bypass air flow rate is controlled by using both the on-off control valve 16 and the idle speed control valve 15.

When it has been judged in step 901 that the atmospheric pressure is lower than the predetermined value $\alpha$, the operation proceeds to step 902, where it is judged whether the on-off control valve 16 is open. When the on-off control valve 16 is open, the operation proceeds to step 912, thus completing the control operation. When it is judged in step 902 that the on-off control valve 16 has been closed, the operation proceeds to step 903, step 904 or step 905, where it is judged whether any of the valve switch over conditions is satisfied. More specifically, in steps 903, 904 and 905, it is judged whether the fuel supply is discontinued (a fuel cut), whether the load of the engine is smaller than a predetermined value $\beta$, or whether the engine is accelerated at a predetermined rate. When one of these conditions is satisfied, the operation proceeds to step 906, where the on-off control valve 16 is opened and the idle speed control valve 15 is adjusted so as to reduce the air flow rate passing through the valve 15 by an amount corresponding to the air flow rate passing through the on-off control valve 16. Then, the operation proceeds to step 912, thus completing the control operation.

When it has been judged that none of the conditions are satisfied in steps 903-905, the operation proceeds to step 912, thus completing the control operation.

During the fuel cut, no fuel is injected, in other words, no combustion is conducted. Therefore, during the fuel cut, because no torque is generated, torque change never occurs even if the valve change over is effected.

When the engine load is the predetermined value $\beta$ or greater, a torque hardly varies even if the switch over of the control valves are effected. For example, expressing the load by an intake air flow rate, when the change over of the control valves is effected while an intake air flow rate is 150 m³/h, a change in the intake air flow rate is, for example, 3 m³/h. This slight 2% variation and the torque hardly varies. Accordingly, even if the switch over of the control valves is effected, the torque variation resulted from the valve switch over can be neglected. The predetermined engine load value $\beta$ is determined from an internal combustion engine itself. The predetermined load may be expressed by other known load values regarding an internal combustion engine, such as a pressure in the intake pipe or a basic amount of fuel injected.

When the vehicle is accelerated at a predetermined rate or greater, a load is also large to a certain degree, so that the same result as described above can be obtained. Further, during acceleration, the torque is varying. Therefore, a slight torque valiation can be neglected.

Referring back to FIG. 4, when it has been judged in step 901 that the atmospheric pressure is higher than the predetermined value a, the operation proceeds to step 907, where it is judged whether the on-off control value 16 is closed. When the on-off valve 16 is closed, the operation proceeds to step 912, thus completing the control operation. When it is judged in step 907 that the on-off control valve 16 is opened, the operation proceeds to step 908, step 909 or step 910, where it is judged whether the switch over of the valves may be effected in the same way as the steps 903-905. When it is judged that the switch over of the valves may be effected, the operation proceeds to step 911, where the on-off control valve 16 is turned off and the idle speed control valve 15 is adjusted so as to increase the air flow rate passing therethrough by an amount corresponding to the air flow rate which has been allowed by the on-off control valve 16. Then, the operation proceeds to step 912, thus completing this control operation.

With the control described above, the switch over of valves is effected when it is judged on the basis of the atmospheric pressure detected by the atmospheric pressure sensor 36 that the control valves should be switched over and when no torque is generated by the internal combustion engine 1 (during fuel cut) or when a torque equal to or greater than a predetermined value is caused in the internal combustion engine 1 (when the acceleration rate is a predetermined value or greater, or when the engine load is a predetermined value or greater). As a result, even if, upon switching over the valves, the air flow rate variation passing through the bypass passage 13 occurs like one shown in FIGS. 5 and 6, a torque variation due to the air flow rate variation do not occur at the fuel cut since torque is not generated and influence of a torque variation due to the air flow rate variation becomes small when the acceleration rate or the engine load is larger than the predetermined value since a large torque is being generated by the internal combustion engine 1.

Accordingly, in the present invention, shocks to the vehicle never occurs, thus enhancing the drivability of the vehicle and freeing the driver from the uneasy feelings.

Figure 7:
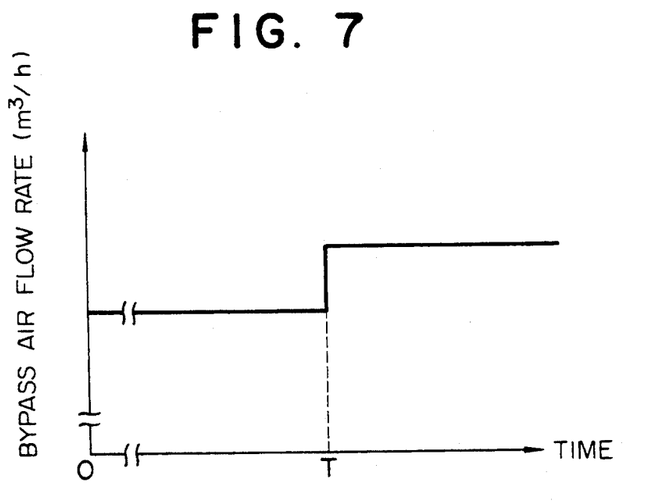
FIG. 7 is a graph showing the relationship between the bypass air flow rate and time.

Further, a change in bypass air flow rate may occur as shown in FIG. 7 when the control valves 16 are switched over due to deterioration of the characteristics of the on-off control valve 16 or the idle speed control valve 15. However, at the instant when switching over of the control valves is performed at the time T under the conditions described above, the torque change is restrained, similar to the case where the bypass air flow rate is instantaneously changed as shown in FIGS. 5 and 6. Thereafter the vehicle becomes in a normal running condition and it is possible to obtain the bypass air flow rate before the valve switching by correcting by feeding back a current bypass air flow rate.

Further, when, as indicated in FIG. 8, the bypass air flow rate may be increased by switching over the idle speed control valve 15 and the on-off control valve 16, the engine speed is increased. If this happens in an automatic transmission vehicle during an idle operation, the vehicle is liable to suddenly start to move. However, according to the present invention, because switching over of the control valves is avoided during an idle operation, such a problem is prevented, thus enhancing the safety of the vehicle.

Although, according to the above embodiment, switching over of the control valves is effected on the basis of the pressure of the atmosphere, it is not limited to the atmospheric pressure. For example, the control valves may be switched when an auxiliary device is started.

Further, though the idle speed control valve 15 and the on-off control valve 16 according to the above embodiment are electromagnetic valves, these valves may be of other types, for example, diaphragm type or step motor type.

Still further, though, according to the above embodiment, the on-off control valve 16 is switched on or off only when any of the following three conditions is satisfied: during a fuel cut; when the engine load is a predetermined value or greater; or when the acceleration rate is a predetermined value or greater, the number of the conditions may be reduced to one by selecting any one of the three conditions. Further, any two of the three conditions may be selected and, thereby, the on-off control valve is switched on or off when either one of the two selected conditions is satisfied.

Further, the number of the conditions which must be satisfied for allowing the on-off control valve to be opened may be different from the numbers of the conditions for allowing the valve to be closed. The critical value employed in a condition for allowing the valve to be opened may be different from the critical value in the condition for allowing the valve to be closed.

Further, more than two on-off control valves may be employed, and different conditions may be assigned to the different valves.

The pressure of the atmosphere may be estimated from other operational data, instead of actually detecting the atmospheric pressure.

Still further, though the bypass passage 13 branches into the two sub-bypass passages 13a and 13b according to the above embodiment, they may be separately connected to the intake pipe 5.

As described above, the bypass air flow rate control apparatus of the present invention changes, during travel of the vehicle, the number of control valves operated by using the switching means on the basis of the conditions preset in the switching judging means and in the engine operation judgeing means. Whereby, it is restrained that the torque changes occurred up on the changing of the valves is transferred to the driver and the like. Accordingly, it is possible to relieve the vehicle shock which gives the driver uneasy feelings and to improve the drivability.

What is claimed is:
1. A bypass air flow rate control apparatus for an internal combustion engine, comprising:
   a plurality of bypass passages bypassing a throttle valve of the internal combustion engine;
   a plurality of control valves for respectively controlling the air flow rates passing through said bypass passages;
   switch over judging means for judging whether it is the time when the number of the control valves operated should be switched over;
   engine operation judging means for judging at least one of whether said internal combustion engine is in a state where a torque equal to or greater than a predetermined torque value is being generated and whether said internal combustion engine is in a state where no torque is being generated; and
   switch over means for changing over the number of the control valves operated when said switch over judging means has judged that the number of the control valves should be switched over and said engine operation judging means has judged that said internal combustion engine is in said state where a torque equal to or greater than a predetermined torque value is being generated or said state where no torque is being generated.

2. A bypass air flow rate control apparatus according to claim 1, wherein said switch over judging means comprises means for judging whether the pressure of an atmosphere is lower than a predetermined value.

3. A bypass air flow rate control apparatus according to claim 1, wherein said engine operation judging means includes means for deciding that said internal combustion engine is in the state in which the torque equal to or greater than a predetermined torque value is being generated when the load of said internal combustion engine is equal to or greater than a predetermined load value.

4. A bypass air flow rate control apparatus according to claim 1, wherein said engine operation judging means includes means for deciding that said internal combustion engine is in a state in which the torque equal to or greater than a predetermined torque value is being generated when at least one of an amount of intake air, a pressure in the intake pipe and a basic amount of fuel to be injected is larger than a predetermined value.

5. A bypass air flow rate control apparatus according to claim 1, wherein said engine operation judging means includes means for deciding that said internal combustion engine is in a state in which no torque is being generated when said engine is in a fuel cut operation.

6. A bypass air flow rate control apparatus according to claim 1, wherein said engine operation judging means includes means for deciding that said internal combustion engine is in a state in which a torque equal to or greater than said predetermined torque value is being generated when said internal combustion engine is accelerated at a rate equal to or greater than a predetermined value.

7. A bypass air flow rate control apparatus for an internal combustion engine having a plurality of bypass passages bypassing a throttle valve provided in an intake pipe, said bypass air flow rate control apparatus comprising:
a first control valve for continuously adjusting the air flow rate passing through one of said plurality of bypass passages;
a second control valve for allowing and shutting off an air flow through another one of said plurality of bypass passages;
means for adjusting an opening degree of said first control valve so that a rotational speed of said internal combustion engine becomes a target rotational speed thereof;
means for judging whether the pressure of an atmosphere is lower than a predetermined value;
means for judging whether said internal combustion engine is in a state in which no torque is being generated;
means for opening said second control valve, under a condition that said second control valve is closed and the pressure of the atmosphere is lower than said predetermined value, when it is detected that said internal combustion engine is in a state in which no torque is being generated; and
means for closing said second control valve when, under a condition that said second control valve is opened, the pressure of the atmosphere is higher than said predetermined value, it is detected that said internal combustion engine is in a state in which no torque is being generated.

8. A bypass air flow rate control apparatus according to claim 7, wherein said engine not torque judging means includes means for deciding that said internal combustion engine is in a state where no torque is being generated when said engine is in a fueld cut operation.

9. A bypass air flow rate control apparatus for an internal combustion engine having a plurality of bypass passages bypassing a throttle valve provided in an intake pipe, said bypass air flow rate control apparatus comprising:
a first control valve for continuously adjusting the air flow rate passing through one of said plurality of bypass passages;
a second control valve for allowing and shutting off an air flow through another one of said plurality of bypass passages;
means for adjusting the opening degree of said first control valve so that a rotational speed of said internal combustion engine will be achieved becomes a taraget rotational speed thereof;
means for judging whether the pressure of an atmosphere is lower than a predetermined value;
means for judging whether said internal combustion engine is in a state in which a torque equal to or greater than a predetermined torque value is being generated;
means for opening said second control valve, under a condition that said second control valve is closed and the pressure of the atmosphere is lower than said predetermined value, when it is detected that said internal combustion engine is in a state in which a torque equal to or greater than said predetermined torque value is being generated; and
means for closing said second control valve, under a condition that said second control valve is opened and the pressure of the atmosphere is lower than said predetermined value, when it is detected that said internal combustion engine is in a state in which a torque equal to or greater than said predetermined torque value is being generated.

10. A bypass air flow rate control apparatus according to claim 9, wherein said engine torque judging means includes means for deciding that said internal combustion engine is in the state in which torque equal to or greater than said predetermined torque value is being generated when the load of said internal combustion engine is equal to or grater than a predetermined load value.

11. A bypass air flow rate control apparatus according to claim 9, wherein said engine torque judging means includes means for deciding that said internal combustion engine is in a state in which a torque equal to or greater than said predetermined torque value is being generated when at least one of an amount of intake air, a pressure in the intake pipe and a basic amount of fuel to be injected is larger than a predetermined value.

12. A bypass air flow rate control apparatus according to claim 9, wherein said engine torque judging means includes means for deciding that said internal combustion engine is in a state in which a torque equal to or greater than said predetermined torque value is being generated when said internal combustion engine is accelerated at a rate equal to or greater than a predetermined value.

13. A bypass air flow rate control apparatus for an internal combustion engine having a plurality of bypass passages bypassing a throttle valve provided in an intake pipe, said bypass air flow rate control apparatus comprising:
- a first control valve for continuously adjusting the air flow rate passing through one of said plurality of bypass passages;
- a second control valve for allowing and shutting off an air flow through another one of said plurality of bypass passages;
- means for adjusting an opening degree of said first control valve so that a rotational speed of said internal combustion engine becomes a target rotational speed thereof;
- means for judging whether the pressure of an atmosphere is lower than a predetermined value;
- means for judging whether said internal combustion engine is in a state in which no torque is being generated;
- means for judging whether said internal engine is in a state where a torque equal to or greater than a predetermined torque value is being generated;
- means for opening said second control valve, under a condition that said second control valve is closed and the pressure of atmosphere is lower than said predetermined value, on one of when it is detected that said internal combustion engine is in a state where no torque is being generated and when it is detected that a torque equal to or greater than said predetermined torque value is being generated; and
- means for closing said second control valve, under a condition that said second control valve is opened and the pressure of atmosphere is higher than said predetermined value, on one of when it is detected that said internal combustion engine is in a state where no torque is being generated and when it is detected that a torque equal to or greater than said predetermined torque value is being generated.

14. A bypass air flow rate control apparatus according to claim 13, wherein said engine no torque judging means includes means for deciding that said internal combustion engine is in a state where no torque is being generated when said engine is in a fuel cut operation.

15. A bypass air flow rate control apparatus according to claim 13, wherein said engine torque judging means includes means for deciding that said internal combustion engine is in the state in which a torque equal to or greater than said predetermined torque value is being generated when the load of said internal combustion engine is equal to or greater than a predetermined load value.

16. A bypass air flow rate control apparatus according to claim 13, wherein said engine torque judging means includes means for deciding that said internal combustion engine is in a state in which a torque equal to or greater than said predetermined torque value is being generated when at least one of an amount of intake air, a pressure in the intake pipe and a basic amount of fuel to be injected is larger than a predetermined value.

17. A bypass air flow rate control apparatus according to claim 13, wherein said engine torque judging means includes means for deciding that said internal combustion engine is in a state in which a torque equal to or greater than said predetermined torque value is being generated when said internal combustion engine is accelerated at a rate equal to or greater than a predetermined value.

* * * * *